United States Patent [19]

Kronogård

[11] 4,220,057
[45] Sep. 2, 1980

[54] GAS TURBINE-TRANSMISSION PLANT

[76] Inventor: Sven-Olof Kronogård, Karstorpsvägen 31, Lomma, Sweden 23400

[21] Appl. No.: 835,035

[22] Filed: Sep. 20, 1977

[30] Foreign Application Priority Data

Sep. 24, 1976 [SE] Sweden .................. 7610579

[51] Int. Cl.² .......................................... F16H 47/08
[52] U.S. Cl. .................................................. 74/688
[58] Field of Search ................ 74/674, 688, 687; 415/122 R; 60/39.16 SI

[56] References Cited

U.S. PATENT DOCUMENTS

| | | | |
|---|---|---|---|
| 2,472,878 | 6/1949 | Bauman | 253/16.5 |
| 2,919,604 | 1/1960 | DeLorean | 74/677 |
| 2,959,984 | 11/1960 | Wickman | 74/688 |
| 3,106,855 | 10/1963 | Reichenbaecher | 74/705 |
| 3,426,617 | 2/1969 | Tosi | 74/688 |
| 3,498,057 | 3/1970 | Kronogard et al. | 60/39.16 |
| 3,772,939 | 11/1973 | Hause | 74/677 |

FOREIGN PATENT DOCUMENTS 882847 11/1961 United Kingdom ............... 74/688

Primary Examiner—Samuel Scott
Assistant Examiner—Randall L. Green
Attorney, Agent, or Firm—Cantor and Singer

[57] ABSTRACT

In an automotive gas turbine power plant including at least one power turbine rotor and a further turbine rotor driving the compressor of the plant, the latter rotor is undersized with respect to the power consumption by the compressor during normal operation and is augmented from the power turbine rotor. The auxiliaries of the power plant are driven from the power turbine rotor, which is connected to the power output shaft, as well as to the compressor turbine rotor by means of a planetary gearing permitting a braking of the output shaft to standstill without the speed of the power turbine rotor being reduced to below that necessary for operating the auxiliaries.

4 Claims, 6 Drawing Figures

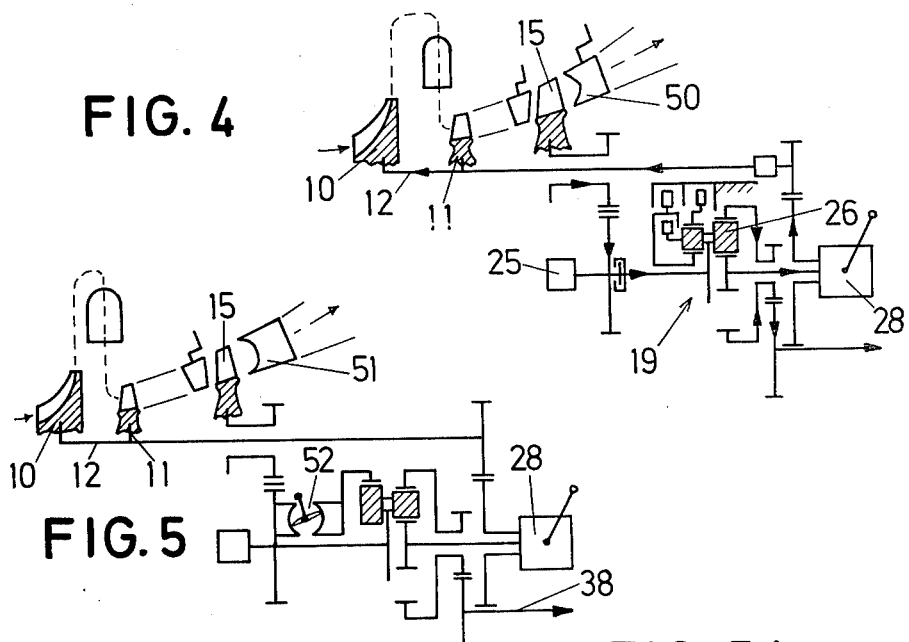
FIG. 4
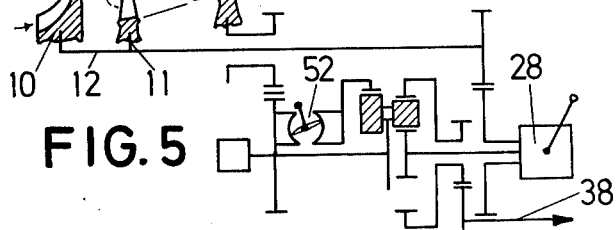
FIG. 5
FIG. 5A
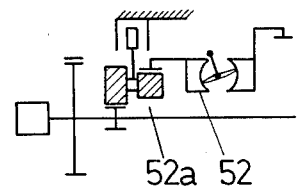
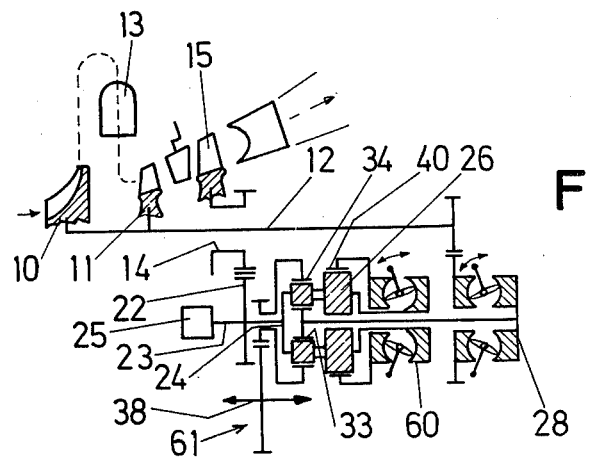
FIG. 6

GAS TURBINE-TRANSMISSION PLANT

BACKGROUND OF THE INVENTION

Known automotive gas turbines of conventional design, having a free power turbine as a last stage, will encounter several difficulties. The auxiliaries of the plant are preferably driven from the gasifier portion in order to permit the power turbine to produce a full starting torque (about 2:1), and also to dispense with the torque converter in an automatic gear box (usually a torque converter+three ratios forward and one ratio reverse in an ordinary car) and the corresponding losses and costs. By adding the auxiliary drive to the gasifier portion the latter will have a slow acceleration performance, or will suffer from over-temperatures, meaning an increased fuel consumption and problems concerning exhaust gas emissions (NOx) and useful lifetime (hot components). In order to meet such troubles the hydraulic torque converter has been re-introduced, and it will then have to take care of the full output torque. In such manner the auxiliaries may be driven from the power turbine, which will always rotate when the plant is operating, and which drives the pump in the hydraulic torque converter. That will, however, imply extra losses. In order to reduce those a direct clutch (lock-up) has been introduced in the hydraulic torque converter, which at high speed locks the torque converter and eliminates its slip losses. Practical use has, however, shown that this "lock-up" is easily forgotten, and also with consideration to the driving the auxiliaries is used during very high speed only, which means that part-load fuel consumption will be high. This is especially noticeable during stall, when the power turbine speed increases and the torque ratio is reduced from 2:1 to about 1.5:1, which must be compensated by the torque converter.

SUMMARY OF THE INVENTION

The present invention aims at solving the problem, above referred to, by proposing a combined turbine-transmission system, which permits the output shaft being braked to standstill, without the speed of the power turbine being reduced to below that necessary for operating the auxiliaries. This is obtainable by means of the system without any hydraulic or other slipping member being used for the (full) torque of the plant, while simultaneously the desirable number of gear ratio steps, forward and reverse, are obtainable.

A gas turbine-transmission plant includes a first turbine driving the compressor, but being undersized with respect to the power consumption by the same during normal operation, at least one power turbine rotor, conventional auxiliaries, and a stepped planetary gearing interconnecting the turbine rotors. According to the invention the input to the gearing occurs at least by way of the plant carrier, the output to the power take-off shaft and the auxiliaries being extracted from one end of the planetary gear wheels, while the opposite ends of the planetary gear wheels cooperate with elements adjusted to change the gear ratio of the gearing.

The gas turbine-transmission system furthermore is designed so the same housing and other main components will accomodate two-, as well as three-shaft turbines, the first alternative including two or three stages, and the latter alternative having three, preferably counterrotating turbine stages.

The transmission system is designed so it, without any substantial alterations, may be used with all systems above mentioned.

BRIEF DESCRIPTION OF THE DRAWINGS

FIG. 4 shows an embodiment having a single output stage only, and FIGS. 5 and 6 show further modifications, where the lamella clutches in the previous embodiments have been substituted by variable transmissions.

DESCRIPTION OF SOME PREFERRED EMBODIMENTS

Figure 1:
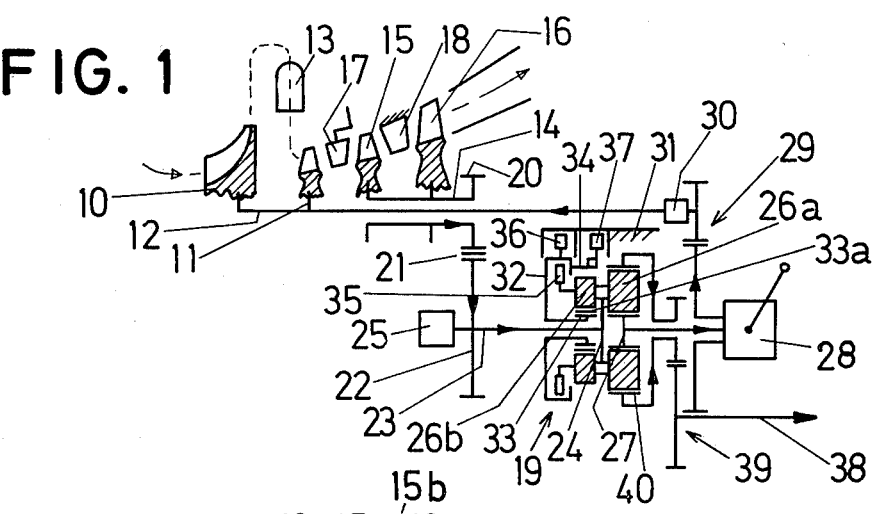
FIG. 1 shows a gas turbine plant according to the invention, where the power turbine includes two rotor stages.

The gas turbine-transmission plant shown in FIG. 1 comprises a compressor 10 and a turbine rotor 11 drivingly connected to the compressor by being mounted upon the same shaft 12 as the latter. The compressor delivers air to a combustor 13. The gas generated therein will first pass the compressor turbine 11, and then two further rotors 15 and 16 of an output turbine, being mounted upon a common shaft 14. Guide vanes 17, having a variable geometry, are fitted between rotors 11 and 15, and fixed guide vanes 18 are fitted between rotors 15 and 16.

Torque is transferred to an output shaft by way of a planetary gearing, generally denoted by 19. Shafts 11 and 14 will rotate in opposite directions, and a pinion 20 upon shaft 14 cooperates with a pinion 22 upon the input shaft 23 to the planetary gearing, by way of an idler 21. The input shaft 23 is connected to the planetary gear wheel carrier 24 of the planetary gearing. This shaft will further drive the auxiliaries of the plant, i.e. fuel pump, electric generator and so forth, generally denoted by 25. When rotors 11 and 14 are arranged to rotate in the same direction, idler 21 will be omitted.

The planetary gear wheels 26 are of a stepped design, i.e. they comprise integral portions having different diameters. The portions having the bigger diameter (the primary end, a) are used for extracting power, whereas the portions having the smaller diameter (the secondary end, b) cooperate with various components for obtaining variations in the exchange ratios.

The sun wheel 27 cooperating with the primary ends 26a is connected to an infinitely variable transmission 28, from which supplementary power, by way of a gearing 29, may be transferred to shaft 11 of the compressor turbine. A free wheel 30, or a clutch is fitted between gearing 29 and shaft 11. In view of a general desire to reduce stresses and to obtain a low intertia the compressor turbine 11 is undersized with respect to the demand for driving the compressor. The necessary, supplementary power may, for all operating conditions, be transferred to the compressor turbine 11 by means of the variable transmission. The higher inertia of the power turbine (two rotors) may be used for accelerating the compressor.

Part of the housing of the planetary gearing is shown at 31 and encloses a lamella clutch, used for locking various components in the gearing, whereby different gear exchange ratios, as well as reverse running, are obtainable. The clutch comprises a rotatable casing 32, which is mounted upon a sun wheel 33, cooperating with the secondary ends of the planetary gear wheels. A first ring wheel 34 also cooperates with secondary ends 26b. Idlers 33a are provided between secondary ends 26b, and ring wheel 34. A first clutch lamella 35 is adapted to lock planetary gear wheels 26 in relation to the rotatable casing 32, while a second lamella 36 is adapted to lock the latter in relation to the stationary gearing housing 31. A third lamella 37 is adapted to lock ring wheel 34 to the stationary housing.

During normal driving forwards none of the lamellas is engaged. A locking of sun wheel 33 to the stationary housing 31 will result in a low gear ratio, a locking between ring wheel 34 and the stationary housing 31 will provide reverse running. A locking of the planetary gear wheel carrier to sun wheel 33, by way of the rotatable casing 32, will provide a direct gear ratio.

The power take-off shaft is denoted by 38, and is connected to a ring wheel 40 cooperating with the primary ends 26a of the planetary gear wheels by way of a gearing 39.

This will provide a compact unit with fine exchange ratios, as well as with a high degree of flexibility with respect to selecting these ratios. As the first turbine stage 11, which is subjected to the hottest gases, is undersized and runs with a comparatively low peripheral speed, the gasifier portion may be operated at a relatively higher speed and/or at an increased $T_{max}$, when the speed of the power turbine is reduced, which will improve the efficiency and the transfer of torque.

Depending upon the desired direction of rotation at the turbine rotors, and the necessary gear exchange ratios, idlers (reversing gear wheels) may be introduced at various points, for instance, as shown, at the reduction gear of the power turbine, or between the stepped planetary gear wheels and some of the sun- or the ring wheels cooperating therewith during feed-back to the gasifier portion, or to the final step at the output shaft.

When two of the components of the planetary gearing are locked the output shaft will also be locked, which may be utilized for instance during parking and/or for automatic "hill-holding" during a stop at a gradient, without the brakes having to be applied.

This embodiment, as well as the following modifications thereof may be equipped with a heat exchanger, where residual heat in the exhaust from the turbines may be used for heating the air supplied to combustor 13.

Figure 2:
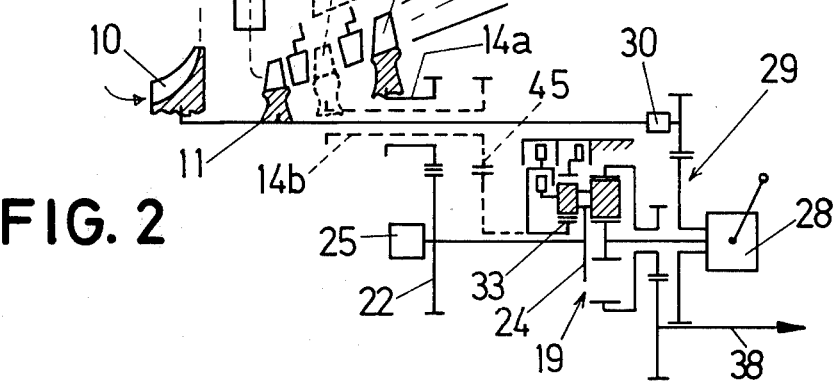
FIG. 2 shows a modified embodiment having two separate output stages, and where the turbine, in general, is designed so one of the stages may be omitted.

The embodiment according to FIG. 2 includes the same gearing as is shown in FIG. 1, but the turbine part differs slightly. Where applicable the same reference numerals are used.

Instead of the two interconnected power turbines 15 and 16, two separate turbine rotors 15a and 16a are provided, being mounted in basically the same housing as that of FIG. 1. Rotor 16a is mounted upon a shaft 14a, which drives wheel 22, and thus the planetary gear wheel carrier 24.

Rotor 15a is mounted upon a shaft 14b, and is by way of a gearing 45 connected with sun wheel 33. Turbine rotor 15a, as well as the pertaining shaft and gearing are in FIG. 2 indicated by dotted lines. It is possible with very small changes, and by fitting some additional members, indicated at 15b, to turn the turbine into a 2-rotor unit. Such simple solution can be interesting on several occasions, and the production costs will be low, as a number of components from the 3-rotor unit may be used.

Figure 3:
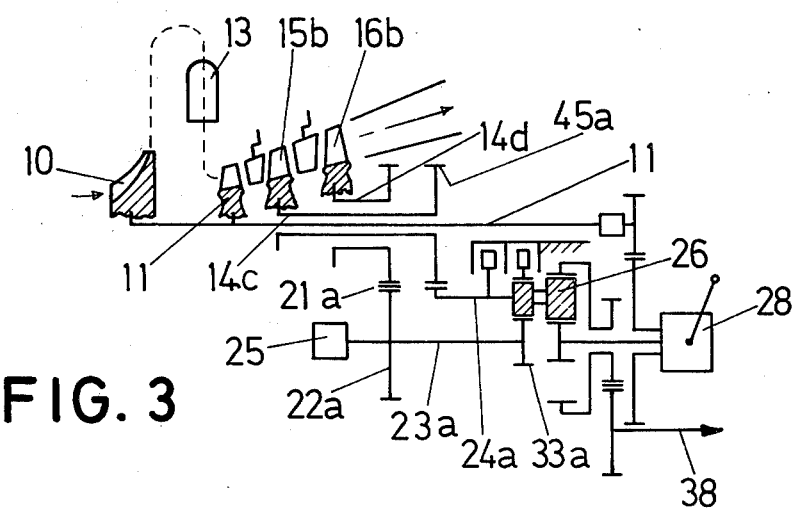
FIG. 3 shows a turbine according to a further modified design having two output stages.

In an automotive 3-rotor plant one of the power turbines supplies the main output and will then be brought to a standstill, when the car is braked, whereas the other power turbine rotor must continue to rotate in order to supply power to the auxiliaries. While maintaining the relative positions of the rotors within the housing it is possible to switch over above mentioned functions between the two rotors, as is shown in FIG. 3.

Here the up-stream power turbine rotor 15b is connected to a planetary gear wheel carrier 24a by way of shaft 14c and gearing 45a. The downstream rotor 16b is connected to shaft 23a by way of shaft 14d, idler 21a and gear wheel 22a. Shaft 23a is connected to sun wheel 33a, which cooperates with the secondary ends of planetary gear wheels 26. Also in this embodiment a number of components in the turbine portion and in the gearing will be the same as in the previous embodiments.

FIG. 4 shows a simplified arrangement of a 2-shaft turbine, mainly corresponding to that of FIG. 2. Also here compressor turbine 11 is undersized, although not to the same degree as in the previous embodiments. Most of the components are also the same. The specific power and the torque transfer will be reduced in this simplified version, and in order to compensate that, an outlet diffusor 50 of a special design is incorporated. The leading edges of the diffusor vanes are arc-formed and their angular position may be adjustable. The compressor, further, may be provided with adjustable diffusor vanes in order to increase its output and to ensure a higher degree of flexibility during part load conditions.

FIG. 5 shows a modification of the 2-shaft arrangement according to FIG. 4. The same components are largely utilized, but the outlet diffusor 51 is provided with stationary vanes. Instead of the lamella brakes, which have been included in the previous embodiments, this plant is provided with an infinitely varible transmission 52, which ensures a continuous changing of the gear ratio when driving forwards, as well as in reverse. This is obtainable without other slipping losses than those occuring in the power turbine, the losses of which are recoverable to 90 á 95% in the heat exchanger, which is not shown in the drawing, but is a standard equipment with most gas turbine plants.

FIG. 5a shows a detail of a modification which includes an intermediate gear ratio exchange step 52a.

FIG. 6 shows a further modification of the embodiment according to FIG. 4. The turbine portion and the planetary gearing are basically the same.

Shaft 23 of power turbine 15 is connected to planetary gear wheel carrier 24 by way of shaft 14 and gear wheel 22. The planetary gear wheel carrier is further, by an infinitely variable transmission 60 connected to a ring wheel 40, cooperating with the primary ends of planetary gear wheels 26.

The output is extracted from the ring wheel 34, cooperating with the secondary ends of planetary gear wheels 26, and is, by way of a gearing 61 transferred to the output shaft.

Supplementary power to shaft 12 of the compressor turbine is here transmitted by way of sun wheel 33 cooperating with the secondary ends of planetary gear wheels 26. Infinitely variable transmissions 28 and 60 are provided, the transmissions being of substantially the same shape and size, differing only with respect to the manner of attachment. The arrangement permits a high degree of flexibility and a simple lay-out. In a modified embodiment an extra exchange step and/or a reversing step, similar to that of FIG. 5a, may be introduced ahead of transmission 60 in order to alter the exchange range.

The stepped planetary gears may be modified in several ways, and may for instance be designed with cylindrical or conical gear teeth.

The embodiments above described are to be regarded as examples only, illustrating various applications of the invention, but further modifications, implying the addition, or the deletion of components, such as turbine or compressor stages, gear steps, free wheels and clutches, may be made within the scope of the appended claims.

What I claim is:

1. An automotive gas turbine-transmission plant comprising a compressor, a first turbine driving the same, at least one power turbine, as well as conventional auxiliaries,
   (A) said first turbine being undersized with respect to the power consumption of the compressor during normal operation,
   (B) a stepped planetary gearing interconnecting said first and said at least one power turbine and including first and second sun wheels, a planet carrier supporting a set of stepped planet gear wheels a planet gear wheel having a small diameter at one end thereof and a planet gear wheel having a big diameter at the other end, as well as at least one ring wheel,
   (C) first means to transfer power input from said at least one power turbine to said gearing by way of said planet carrier,
   (D) second means to extract power from the gearing to an output shaft, as well as for driving said auxiliaries externally from one end of said planetary gear wheels,
   (E) third means, cooperating with the other end of said planetary gear wheels, for changing the gear ratio between input and output at the gearing, said third means including a lamella clutch surrounded by a rotatable casing which is mounted on said first sun wheel, and a housing enclosing the gearing, and in which the first sun wheel, cooperates internally with the small diameter planetary gear wheel, said lamella clutch having a first lamella, and a second lamella, said first lamella being adapted to lock said planetary gear wheels in relation to said rotatable casing, said second lamella being adapted to lock said rotatable casing in relation to said housing, and
   (F) fourth means to extract power for augmenting said first turbine internally from one end of said planet wheels.

2. The gas turbine-transmission plant according to claim 1 further including a further ring wheel cooperating externally with said small diameter ends of the planetary gear wheels, and means for locking said ring wheels in relation to said housing.

3. The gas turbine-transmission plant according to claim 1 in which the power turbine includes two, fixedly interconnected rotor stages.

4. The gas turbine-transmission plant according to claim 1 in which said fourth means includes a variable transmission.

* * * * *